United States Patent [19]
Kikinis

[11] Patent Number: 5,746,602
[45] Date of Patent: May 5, 1998

[54] PC PERIPHERAL INTERACTIVE DOLL

[76] Inventor: Dan Kikinis, 20264 Ljepava Dr., Saratoga, Calif. 95070

[21] Appl. No.: 606,757

[22] Filed: Feb. 27, 1996

[51] Int. Cl.[6] .............................. G09B 5/00; G09B 3/00; A63H 3/28; G11B 17/22

[52] U.S. Cl. .................. 434/169; 434/307 R; 434/320; 434/322; 434/351; 434/393; 446/298; 369/31; 369/63

[58] Field of Search ................. 434/307 R, 308, 434/319–321, 322, 351, 393, 169; 446/297, 298; 369/31, 63

[56] References Cited

U.S. PATENT DOCUMENTS

| | | | |
|---|---|---|---|
| 5,029,214 | 7/1991 | Hollander | 381/51 |
| 5,493,185 | 2/1996 | Mohr et al. | 318/3 |
| 5,636,994 | 6/1997 | Tong | 434/308 |

*Primary Examiner*—Richard J. Apley
*Assistant Examiner*—John Rovnak
*Attorney, Agent, or Firm*—Donald R. Boys

[57] ABSTRACT

An interactive system for teaching, entertaining, and habituating a child utilizes an interactive entity such as a doll, the doll having a microphone, a speaker, and control circuitry adapted for driving the speaker and microphone and a bidirectional communication link to a personal computer (PC). Scripted data stored at the computer directs doll activity and verbal articulation, and utilizes response from the child through the doll to the PC in directing output to the doll. In alternative embodiments the interactive doll has also servo-mechanisms for providing doll motion, such as eye and mouth and limb movement, which may be coordinated with verbalization in different scripts by commands retrieved at the computer and sent to the doll. In a preferred embodiment environments and applications are provided on CD-ROM disks which may also provide the operating application for the interactive doll system. Systems may be adapted for a broad range of functionality, such as acquaintance of a child with foreign languages, story telling, indirect interaction between an adult and a child through the medium of the doll, and much more.

21 Claims, 3 Drawing Sheets

PC PERIPHERAL INTERACTIVE DOLL

FIELD OF THE INVENTION

The present invention is in the area of computerized interactive toys, and pertains in an embodiment particularly to dolls and toy animals adapted as computer peripherals with bidirectional communication to a host computer remote from the interactive toy.

BACKGROUND OF THE INVENTION

Although the present invention is not limited to dolls, but extensible to many other articles such as stuffed animals and other toys, dolls are utilized in practicing the invention in many embodiments, and dolls are used herein as a convenient vehicle for illustrating aspects, features, and characteristics of the invention. A doll is a personal entity with which a child or adult may interact, among a broader class of personal entities. Children, for example, interact with toy cars, tin soldiers, model airplanes, cartoons, stuffed animals and other representative entities, and many if not all of such entities may be invested in some instances, by extension, with a human personality. There is nothing terribly unusual for example, in a child's world, about a talking car. We see such things on television in commercials and cartoons all the time.

The art of fashioning dolls and stuffed animals, such as teddy bears, is very old. Dolls have been found in ancient burial sites and archeological digs, and have served many purposes in the social history of human beings.

Dolls are typically made in an image of a human being, such as a baby, a small child, or a young man or woman, and it is important in many aspects of fashioning dolls to mimic human attributes. It is therefore reasonable that as technology of various sorts has developed in human history, the same technology has been applied in unique and often inventive ways to fashioning dolls. For example, as knowledge of human anatomy has developed, dolls with articulated limbs have been developed. Other technology has been applied to produce dolls that walk, talk, cry, drink, urinate, and so forth.

Interactivity between a human and a doll is known in the art as well, as simply as in a doll that makes a noise when it is squeezed or poked, or in dolls that close their eyes when placed in a reclining position and open their eyes when placed again upright.

In the record of development in fashioning dolls, electronics has played an important part. Dolls have been adapted with recording and playback equipment, for example, and with speakers, so dolls so equipped may speak to a child. Dolls have been fitted out with simple robotics devices, and made to crawl or walk. There are many other examples in the art of dolls comprising electronic gadgets to better simulate human activity and response.

There has been, however, a limitation in the level of sophistication that doll developers have been able to attain, due to a number of factors. Among these factors is the fact that dolls are, in many instances the charge and property of small children, who have no knowledge of electronics and mechanisms, and therefore cannot care for a doll as a machine. Equipment in such a doll needs to be rugged and durable. Cost is also a factor. Electronic equipment can be quite expensive in the relativity of things that are built into dolls, so there is a tendency to avoid very sophisticated equipment in dolls.

Another factor in doll development is the physical space available for electronics. Although some dolls are quite large, most are relatively small, and space for mechanisms and equipment inside a doll is limited.

For these and other reasons, electronic capabilities of dolls has been somewhat limited, so although dolls that speak a number of different phrases or perform a number of different human-like actions may be impressive to many, there is a need for much more capability in dolls. There are no dolls, for example, to the inventor's knowledge, that can carry on a conversation with a child, and certainly not in more than one language. There are no dolls that are capable, with prompting by natural interaction, to recite stories to a child, and to repeat portions of a story on request or just start and stop as the child reacts and responds.

As to a need for sophisticated interaction with a child, an article in Newsweek magazine for Feb. 19, 1996, titled "Your Child's Brain," discusses in some detail processes of learning in children, and indicates that children begin fundamental learning processes very early, perhaps as early as three months of age; and that these processes provide neural connections in a child's brain for distinguishing, for example, between different sounds. For a child to form such associations properly, however, the sounds need to be true-to-life. Unfortunately, animated dolls and animals up to the present time have been limited to few, and low-quality representations.

Extrapolating from the indications in this summary article, If a child is limited in cultural interaction until later in childhood than these critical months and years, that child horizons may be severely limited in later years. There is a place for a very electronically sophisticated doll in such a scenario as an interactive companion for a child, wherein the doll may have access to substantial knowledge and skill, and also have ability to help a child learn new skills and develop mentally and emotionally healthy associations.

What is needed is a doll that has real-time access to a potentially unlimited data supply and variable abilities to interact with a child as a knowledgeable and articulate companion. A sophisticated computer, such as a high-end personal computer (PC), has such sophistication and capability, and access to mass storage devices and remote databanks through digital and analog communication links, and also interactive ability through I/O ports and communications, but one cannot expect a young child to sit for long in front of a computer or to interact with the computer. A young child will, however, interact with a doll, and may be expected to interact very strongly and closely with a very sophisticated doll.

SUMMARY OF THE INVENTION

In an embodiment of the invention an interactive system is provided comprising a computer having a CPU, a memory, a first communication port coupled to the CPU, and control routines executable by the CPU; a personalized entity separate from the PC, having therein control circuitry coupled to a microphone, to a speaker and to a second communication port; and a communication link coupling the first and the second communication ports. Through execution of the control routines by the CPU, stored audio data is retrieved by the CPU, passed to the personalized entity via the communication link, and is converted to audible audio at the speaker in the personalized entity, and voice input via the microphone in the personalized entity is converted to audio data by the control circuitry, transferred to the computer via the communication link, and utilized at the computer in conjunction with the control routines to guide selection of stored audio data to be retrieved and sent to the personalized entity.

In a preferred embodiment the personalized entity is a doll, but other entities are useful in some circumstances, such as animal caricatures, and in some cases objects typically considered to be inanimate, such as toy cars and trucks, which may also be imbued with personality and speech. A unique feature of the system is that the communication link between the computer and the interactive doll or other entity is bi-directional. The communication can be provided in a number of ways, such as by infra-red, tethered serial communication via standard serial ports, inductive coupling, and radio frequency broadcast with suitable demodulation. Another option is a direct connection (wire) to a sound card in the host providing thereby analog audio signals directly to the doll or other entity. This communication option is particularly useful for those embodiments requiring only that voice be passed to the doll or other entity.

In a preferred embodiment as well, the computer has a CD-ROM drive, and CD-ROM disks played in the drive provide control routines and data executable by the CPU of the computer for directing output to the doll or other interactive entity and for receiving and evaluating input from the personalized entity.

In some more sophisticated embodiments the system further comprises servo-mechanisms in the doll or other entity adapted for manipulating parts of the doll or entity. In these embodiments the control circuitry in the doll or other entity comprises an input/output (I/O) interface connected to and manageable by the control circuitry to switch power from an on-board power supply to activate individual ones of the servo-mechanisms to provide motion according to movement data sent via the communication link. There may also be sensors adapted for sensing movement and environmental characteristics at the doll or other entity, and input from the sensors is communicated via the communication link to the computer and utilized in conjunction with the control routines to guide selection of motion commands to be sent to initiate motions by individual ones of the servo-mechanisms.

In yet other embodiments the computer includes a speaker, a microphone, and audio conversion circuitry for both, and audible input at the computer speaker is converted to audio data, transferred to the doll or other entity via the communication link, and converted back to audio output at the speaker in the doll. In these embodiments audible input at the doll microphone is converted to audio data, transferred to the computer via the communication link, and converted back to audio output at the speaker in the computer. In this manner such a system may be used for indirect communication between an adult and a child, useful in situations where the child may be expected to interact more freely with the doll than with an adult.

In yet other embodiments the computer further comprises a modem connectable to a telephone link, and audio signals received via the modem over the telephone link are transferred to the personalized entity via the communication link, and converted back to audio output at the speaker in the doll. Audible input at the doll microphone is converted to audio data, transferred to the computer via the communication link, and provided to the modem to be transmitted over the telephone link. IN this manner systems according to embodiments of the invention can provide indirect communication over any distance between one child and another over any distance through the auspices of interactive dolls or other entities.

In some embodiments the computer further comprises a display monitor and display adapter, and through execution of the control routines an interactive display is provided on the display monitor. The interactive display has menus and entry fields whereby a user at the computer may select and alter operation of the control routines.

An interactive doll is provided for interactivity with a child or other person and providing bi-directional communication with a computer, providing thereby the full power of the computer for interactivity and functionality at the doll.

In still another embodiment of the invention, a method for teaching a young child is provided, using the system described above, by (a) recording audio selections for teaching the child on a mass storage device of a computer; (b) retrieving the audio selections as primary audio data, (c) transferring the audio data over a communication link to an electronic doll in proximity to the child; and (d) converting the audio data to audible audio output at a speaker incorporated in the electronic doll.

In other methods based on this method there are additional steps for providing movement for the doll via servo-mechanisms in the doll, the servo-mechanisms directed by commands retrieved from the mass-storage device and transferred to the electronic doll over the communication link, the movements predicated to enhance the teaching experience for the child.

In still other embodiments the method provided uses a microphone in the doll, and has steps for transferring speech input by the child at the microphone as return audio data over the communication link to the computer, and using the return audio data to direct retrieval of primary audio data for transfer to the electronic doll.

In still other embodiments of the present invention the interactive apparatus is provided in an enclosed module of neutral shape, not necessarily recognizable as a specific entity such as a doll. The shape may be rectangular spherical, egg-shaped, or some other convenient shape. Coverall modules are then provided to cover the apparatus module and provide specific shape and recognition characteristics. For example, in the case of an interactive doll, the coverall module might be a rag doll with an internal cavity for the apparatus module, and means for attaching to the apparatus module. There could be several different sizes and external aspects for such dolls, and the coverall module would define the entity.

In these embodiments, utilizing a constant inner module and a variable outer module, the inner module has a sensor and the outer module a contrivance to trip the sensor in a manner to inform the module of the nature of the coverall. This sensed signal is communicated to the host, to initiate specific scripted software meant for execution with that coverall module. There are number of ways such a sensor and activating contrivance may be provided. For example, the outer coverall may have a device variably located to trip one of an array of specific sensors.

Interactive systems according to this invention provide a doll and/or other interactive entity with much more sophistication than has ever been possible before, and with access to all of the power and data handling capabilities of a state-of-the-art personal computer. Mass storage devices at the computer and data and control routines accessible by the computer at remote locations all become accessible to the doll, so data output and quality at the doll is nearly unlimited. For the first time, a personal robotic companion and other interactive articles may be provided for a child which may serve to acclimatize and socialize the child, as well as to teach an enormous quantity of information. At the same time, systems according to embodiments of the invention provide new functionality useful by doctors, psychologists, other behavioral scientists, and others, in communication with young children.

DESCRIPTION OF THE PREFERRED EMBODIMENTS

Overall Aspects of Interactive System

Figure 1:
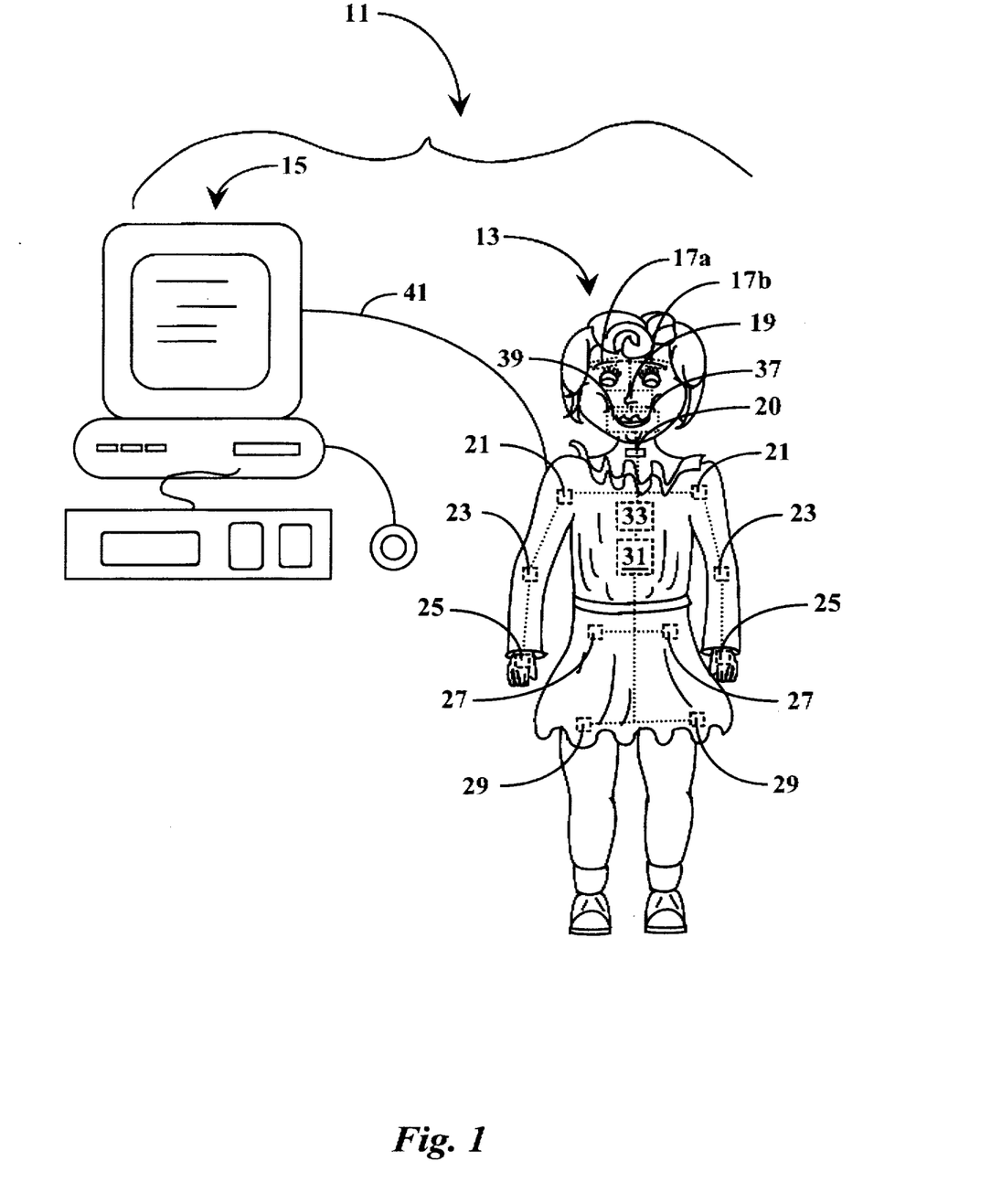
FIG. 1 is a mostly diagrammatical illustration of an interactive doll system according to an embodiment of the present invention.

FIG. 1 is a mostly diagrammatical illustration of an interactive doll system 11 comprising a doll 13 adapted for bi-directional communication with a PC 15 and for interactivity with a person, in an embodiment of the present invention. This unique arrangement provides a doll that is relatively inexpensive for the capability it may exhibit, void of very delicate, relatively expensive mass-storage devices such as hard disks and CD-ROM drives, and yet capable of virtually unlimited interactivity with a person.

PC 15 in a preferred embodiment is a high-end PC with a state-of-the art CPU, a CD-ROM drive, a windows-type operating system, a high-speed modem, and Internet browsing software, and a high-capacity hard disk drive. Exactly these characteristics, however, is not a specific limitation on the invention, as many sorts of PCs exhibiting a broad range of capabilities might be incorporated. In some embodiments no mass storage device is needed, and all control routines and data are imported from remote locations. In other embodiments, control routines are provided by tape, CD-ROM, and the like. In various embodiments, capabilities of a system 11 will be a function of the capabilities of the host PC, among other things.

The shape of doll 13 is somewhat arbitrary. Dolls of many different shapes, sizes, ethnic attributes, and the like may be used, and clothing and accessories for the doll may be as varied as is commonly seen for commercially-available dolls. Moreover, it will be clear from descriptions that follow, that a doll shape is not required for practicing the invention. Other entities may be used in alternative embodiments, such as animal caricatures, robot-like entities, even toys such as toy automobiles and the like. The example of a doll, however, is convenient for conveying many aspects of the invention.

Also, the power of state-of-the art PCs is such that multiple entities may be managed by a single PC, and in some cases separate entities may be managed simultaneously, and there may be interaction between the managed entities; between two separate dolls, for example, or between a managed doll and a toy car or other entity.

Doll 13 in FIG. 1 is a self-contained mechanism comprising both sensors for touch, temperature, and movement; and activators, such as solenoids and motors connected to mechanisms to provide movement of various parts of the doll. servo-mechanical systems 17a and 17b provide eye movement; servo-mechanical system 19 provides mouth movement; servo-mechanism 20 provides movement of the head in multiple axes; servo-mechanisms 21 provide shoulder articulation; servo-mechanisms 23 provide elbow articulation; servo-mechanisms 25 provide hand and wrist articulation; servo-mechanisms 27 provide hip movement; and servo-mechanisms 29 provide knee articulation. It will be apparent to those with skill in the arts related to robotics that there are many electromechanical systems known that can be applied to provide movement to the doll and other entities that might be used in other embodiments.

In addition to the servo-mechanisms described above, doll 13 has a speaker 37 for providing speech and other sound effects for the doll. Speaker 37 is coupled to the power and control system in a manner described more fully below. A microphone 39 for audio feedback is also provided, and coupled to power and control system in the doll also in a manner more fully described below.

Specific sensors are not shown in FIG. 1, but many sorts may be used in various embodiments. For example, an acceleration sensor may be incorporated in the system and set to a threshold to monitor rough movement, such as falling to the floor. Rapid deceleration in such a case could be used to trigger a response from the doll, such as an admonition to be careful and not to play too rough. Other sensors may be used for temperature, and the doll may respond, through processed to be described below, with indications of comfort or discomfort. Tactile sensors may also be used, so touching a doll in different places and in different ways may elicit appropriate responses as well.

Doll 13 in FIG. 1 has electronic control circuitry 31 for managing functions of the doll, and for coordinating input from sensors and output to electromechanical systems. The control circuitry includes a microprocessor, a memory, digital sound circuitry, and interface circuitry for operating the various servo-mechanisms that provide movement of the various moveable portions of the doll. Input/Output (I/O) interfaces for switching power to servo-mechanisms via logic-level, computer-generated signals are well known in the art.

Power supply 33 may be any of a number of storage and rechargeable power systems suitable for the power requirements of such a doll. Many sorts of storage power supplies are known in the art and would be suitable for powering such an electro-mechanical doll. In some embodiments storage cells are used, in others, rechargeable batteries such as those used for cellular phones and cordless power tools are incorporated. In some embodiments, power is provided from outside the doll by a tether or other connection to an external power source.

In addition to the control, sensing, speech and other audio output, and servo-systems briefly described above, doll 13 in interactive doll system has a communication link to host computer 15. In one embodiment the communication link is a serial link to an industry-standard serial port at the computer. In another embodiment, the link is a parallel link via a standard or enhanced parallel port. In other embodiments the communication link is a cordless link, by any of several well-known methods, such as, for example, RF broadcast, UHF broadcast, infra-red, fiber-optic, inductively-coupled, and so forth. In FIG. 1, a cord-type communication link 41 is indicated. Cord or cordless links may be implemented by a number of different protocols, including among others, standard serial port (SSP), standard parallel port (SPP), by audio analog from a sound card in the host, by a special device as an add-on card to the host, by a soon-to-be available Universal Serial Bus (USB) developed by a computer-industry consortium, and others.

Doll 13 is an interactive peripheral device to host computer 15 in interactive system 11, a computer peripheral in words of the art. It is by the communication link that doll 13 attains access to the full computing and data power of host 15. In a preferred embodiment, as described briefly above, the host computer is a state-of-the art PC having both a high-capacity hard disk drive and a CD-ROM drive, as well as a powerful CPU, such as one of the Intel Pentium™ CPUs available at the time of this specification. The choice of communication link is driven by, among other factors, the sophistication of doll 13 and host 15. If both are relatively sophisticated, a higher speed and broader-band link is desirable, because the data flow will be more robust. In less sophisticated systems, slower and less-broad links are indicated.

In various embodiments of the present invention described herein, just as most computers may support two or more peripheral devices, a state-of-the-art PC has sufficient power to support two or more interactive dolls or other interactive entities simultaneously and in substantially real time. Several dolls may be thus supported and operated from the same software script. In embodiments described, it is thought sufficient to describe one such doll in each embodiment.

By the fact of the peripheral connection, interactive doll 13 acquires all of the considerable computing and data power of the host. In alternative embodiments, wherein the host has an appropriate analog or digital telephone modem and Internet operative software, the doll acquires in addition access to numerous stores of data from all over the Earth. The doll as a computer peripheral becomes a doll with aptitude and attitude.

More Detailed Structure of Doll and PC

Figure 2:
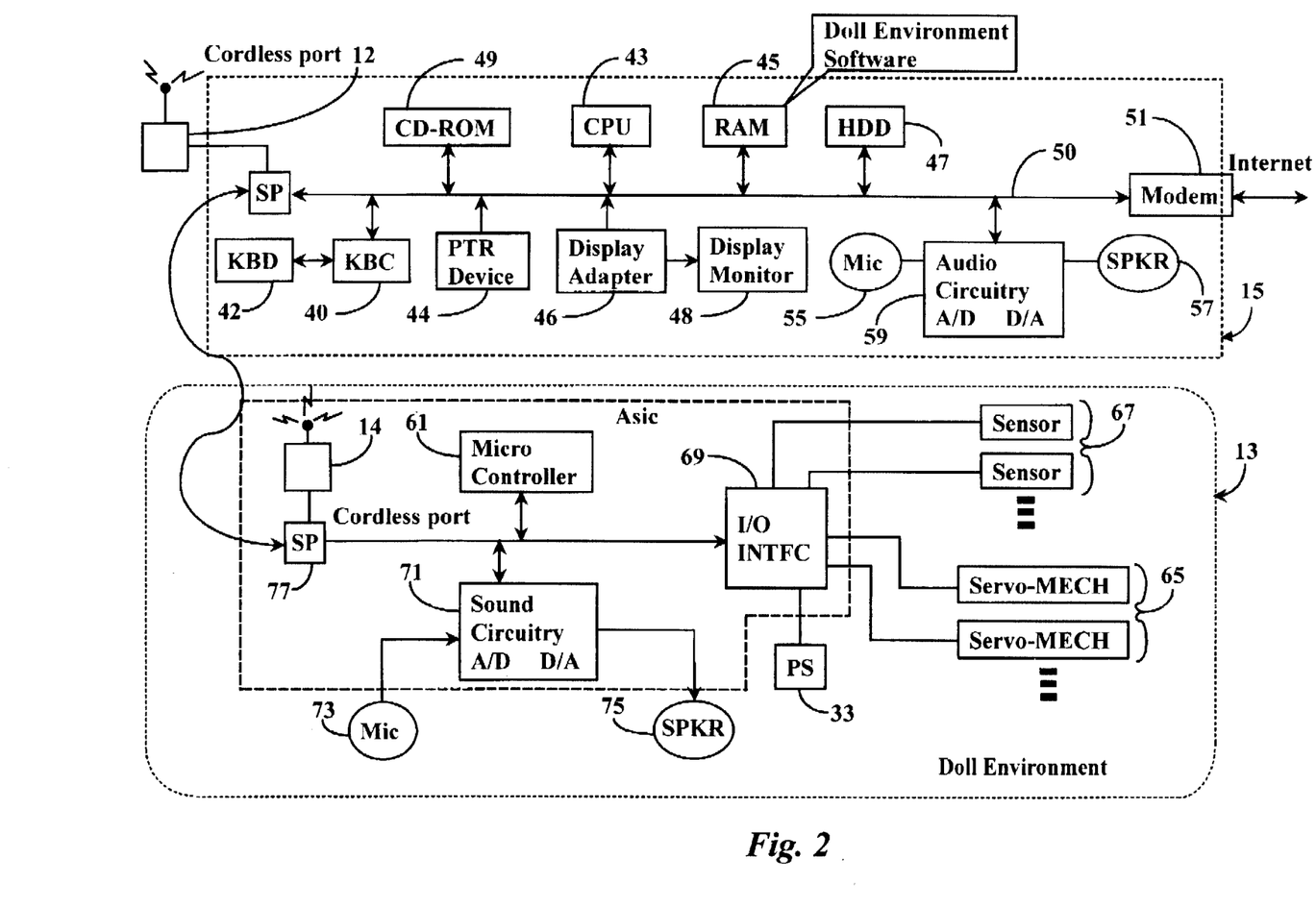
FIG. 2 is a more detailed diagram of control and power systems in the interactive doll system of FIG. 1.

FIG. 2 is a diagram of control and power systems in both host computer 15 and doll 13 of FIG. 1, including alternate communication links between the two, in more detail than is shown in FIG. 1. PC 15 is, in its hardware-only aspects, a conventional PC, comprising among other hardware components a CPU 43, random-access memory (RAM) 45, a hard-disk drive (HDD) 47, and a CD-ROM drive 49. Communication between the components is via bus structures 50. It will be apparent to those with skill in the art that in state-of-the art PCs bus communications can be more complex than shown in FIG. 2, including local buses, peripheral buses, and the like, with connecting chip sets. Bus structure 50 is meant merely to represent any conventional sort of bus arrangement between well-known components.

In addition to internal components, PC 15 has also a keyboard controller (KBC) 40 and a connected keyboard (KBD) 42, a pointer device 44, a display adapter 46, and a display monitor 48, as is known with most state-of-the-art PCs.

As explained briefly above, a high-end PC is preferred to provide computing power and mass-storage capacity for relatively sophisticated interactive doll applications, but less powerful systems may be utilized for less sophisticated applications. In practice, if a customer for such a doll has already a computer in the home, he or she may purchase a doll and control routines to match the capacity of the already-available PC.

PC 15 has also in this embodiment a microphone 55 and a speaker 57 with appropriate audio circuitry 59 providing analog-to-digital and digital-to-analog conversion for audio communication with an operator at PC 15. Devices known as CODECs are commercially available for this function. There is also a modem 51, which may either of an analog or digital type, such as an Integrated Services Digital Network (ISDN) interface, and also resident software for Internet access and browsing. PC 15 has also a serial port 53, which in this embodiment is used for communication with doll 13 over serial communication line 41.

Control circuitry 31 introduced above in doll 13 is indicated in FIG. 2 in additional detail. The outer aspects of the doll are indicated only by a dotted area in FIG. 2, but it should be understood, as briefly explained above, that many sorts of dolls with many kinds of clothing and decorations may be used. The environment is not limited to dolls, either, and other entities may be used, depending only on the imagination of suppliers of control environments for such interactive entities, as is described in more detail below.

Management functions are provided by a microcontroller 61. The microcontroller has on-board registers providing a minimum buffer capability for data stream from PC 15 in operation in many embodiments. In some embodiments there may be other storage capability, but it is preferred that as much functionality as possible be provided by PC 15, keeping doll 13 cost effective. Digital components are shown connected through a bus structure 62 in FIG. 2, which, as for PC 15, represents any of a variety of buses and combinations of buses that might be used. In doll 13, however, it is preferred that as many of the digital functions as possible be provided on board a single ASIC chip, so bus communications will be, in most embodiments, an on-chip function.

Doll movement of various sorts is provided by servo-mechanisms 65, representing the several servo-mechanisms described above for head, eye, hand, arm movement and so forth. As described above, different embodiments of interactive dolls according to the invention may have different sets of servo-mechanisms, and more or less sophisticated movement abilities.

Feedback for range and speed of movement of doll parts and the like is provided by sensors 67 associated with servo-mechanisms 65. Such sensors, which may include optical sensors, trip switches, proximity sensors and so forth are well-known in the arts of machine control and robotics, and need not be described in detail herein. Sensors 67 are meant to represent also stand-alone sensors for such as local temperature, pressure, tactile sensations and so forth for doll 13, and may or may not be used, depending on requirements of specific embodiments.

Both sensors 67 and servo mechanisms 65 are interfaced through an I/O interface 69 connected to power supply 33 and controlled by digital signals provided on bus structure 62. Such I/O interfaces are well known in the arts of machine control and robotics, and are familiar to those with skill in these arts. Many or all of these I/O functions may also be provided on the same ASIC chip comprising microcontroller 651.

Digital signals are decoded by I/O interface 69 to switch power from power supply 33 to various of servo-mechanisms 65 for producing doll motion, and motion is monitored by various of sensors 67. Input to I/O interface 69 from sensors 67 are provided to microcontroller 61 as digitized signals, and used by control functions for control of doll motions.

Doll 13 also has sound circuitry 71 interfacing a microphone 73 and a speaker 75 to bus structure 62 and microcontroller 61, whereby the doll may speak to a child or other person, and the child or other person may speak to the doll and have verbal communication digitized and provided to control systems in the doll and the PC. As described for PC 15, the sound circuitry may be provided by a commercially available CODEC.

There is also a port 77 connected to bus structure 62 in doll 13, in this embodiment a serial communication port, for communication with PC 15. In a preferred embodiment this port and its digital circuitry are integrated with the ASIC of the microcontroller and other digital components. Port 77 in doll 13 and port 53 in PC 15 are connected by serial line 41, providing serial communication between the doll and the PC.

In alternative embodiments communication is provided in a manner other than by a serial communication line 41 as shown in FIG. 1 and FIG. 2. Cordless communication is preferred in many embodiments to provide freedom of movement for the doll and person with the doll, and for safety for young children. With appropriate circuitry communication can be by infra-red code, by inductive coupling, and by broadcast links of several types. In one embodiment cell phone circuitry is utilized to provide communication between the host and the doll. Cordless communication interfaces 12 and 14 in FIG. 2 are meant to encompass the several types of cordless communication that might be used.

In some embodiments using broadcast communication, maximum freedom of movement is provided by having relay station capable of receiving, transmitting and amplifying communication signals. Relay stations may be provided, for example, throughout a home or building, with a single PC at one location, so a cordless system with limited range may cover a much broader area.

In the general arrangement shown, the doll is a peripheral device to the PC, having two-way communication, and the considerable power of the PC, including data and control routines from HDD 47 and CD-ROM drive 49, as well as data and routines available from the Internet, is made available to the interactive doll. With such computing and data power, a truly interactive and realistic doll may be provided, and there is potentially no limit to the data and personality structures available to doll 13.

Generalities and Specifics of Operation

In one preferred embodiment an operating system for doll 13 is provided on a CD-ROM disk, which, in the current state-of-the-art has the several hundred megabytes of capacity needed for full functionality of such a sophisticated interactive doll. In its outer aspects a doll 13 would be sold as an identifiable entity with integrated clothing and accessories, much as conventional dolls are sold today. Dolls may thus be provided in a broad range of ages, races, cultures, and the like, to suit the needs of many potential users. An individual doll may also have a name, or be named by the purchaser, and a limited range of clothing and accessories may also be provided with the doll.

A doll will be provided with all necessary interface hardware, which, in the case of a serial connection with a tether, will amount to the tether connected to or connectable to the doll and to a serial port of a host computer.

Also provided with the doll will be one or more CD-ROM disks for loading on a PC as well as instructions for connection and initialization. The CD-ROM provides the operating environment for the doll, to be loaded on the host PC and executed by the host CPU, and a complete interactive software system for the doll. The CD-ROM can provide one or more personalities for the interactive doll, for example, and completely scripted environments. Third party suppliers will be encouraged to provide environments and personalities of many different sorts for many different purposes.

When doll 13 is connected to host 15 and properly configured, one simply inserts the appropriate CD-ROM disk in drive 49 and boots the environment program on the disk. Depending on the environment, there may or may not be an accompanying interactive display.

Figure 3:
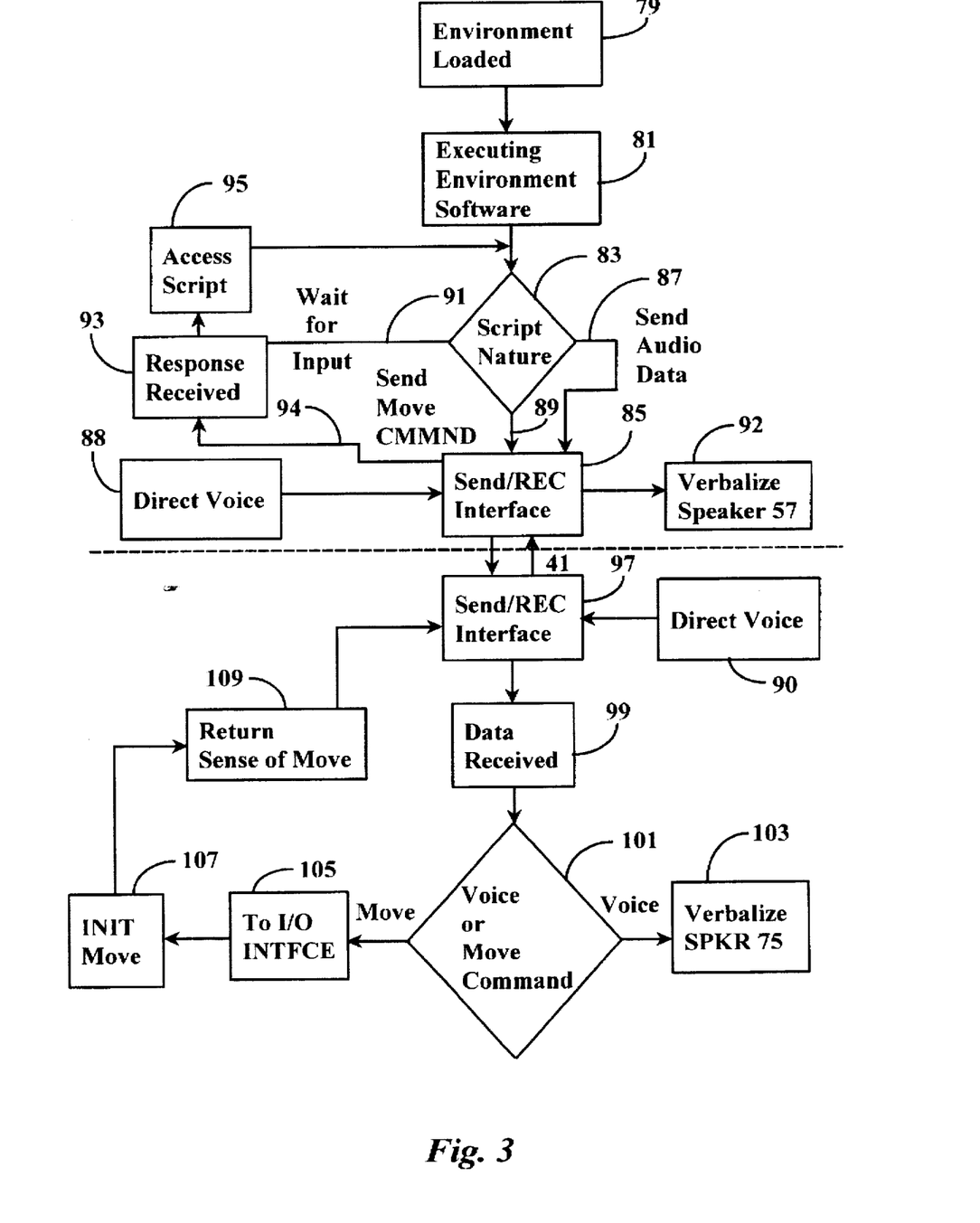
FIG. 3 is a generalized flow diagram of data flow and response in the interactive doll system of FIG. 1.

FIG. 3 provides a generalized flow diagram of data flow between host 15 and doll 13, and general operations on each side. In FIG. 3, at step 79 the environment software is loaded from a CD-ROM for execution. At 81 CPU 43 is executing environment software. As each line of script in execution is executed, at step 83 the nature of the script is determined. If the script is for sending voice, a predetermined voice packet is sent (path 87) to the host send/receive interface 85 for transfer to the doll over the communication link. Interface 85 can be any of the interfaces indicated as 53 and 12 in FIG. 2, and described above relative to FIG. 2.

In some embodiments direct voice communication is allowed from a microphone in the host to the speaker in the doll, and this direct voice feature is represented as beginning at step 88, which bypasses other controls. Voice input in this case passes from microphone 55 (FIG. 2) through audio circuitry 59. Audio data goes to the doll via link 41, and is converted again and output at doll speaker 75, step 103 in FIG. 3.

In these embodiments direct voice is also enabled between the doll and the host. This feature is presented as beginning at step 90. Voice input passes from microphone 73 in the doll, through circuitry 71, is passed to the PC via line 41, and directed to circuitry 59, then speaker 57, represented as step 92 in FIG. 3.

If the script is for movement of the doll a movement command is sent to interface 85 (path 89) for transfer to the doll over the communication link. Some scripts require a specific input from the doll (path 91). If at step 93 the awaited input is received, control proceeds to a new line of script at step 95, directed by the response. One example of prompted response is return of a sensor limit after a directed movement of a portion of the doll. Sensor return is not always required, however. Some movements are timed, and others are simply repetitive. Another example is an expected voice response after a voice output to the doll. In a teaching activity, for example, the host might ask a question, await a voice response, decode the voice response, and proceed accordingly.

In some applications, script is provided to link microphone 55 in host 15 with speaker 75 in the doll. The linkage is, of course, indirect, in that the voice input at the host is digitized, sent to the doll, then converted again to analog form for voice output. In this manner, a parent, a behavioral specialist, or other operator at a computer may speak to a child through the interactive doll in substantially real time, and through microphone 73 at the doll, the child may respond in substantially real time. The doll becomes, in this application, a surrogate for the computer operator. A child, who may not interact directly with an adult, might very well interact responsively to the doll.

On the doll side of the system, send/receive interface 97 represents either of port 77 and cordless interface 14 in FIG. 2, in any of the various forms described above. Step 99 represents data packets received from host 15. At step 101 the nature of data packets, voice or movement, is ascertained. If voice, data is directed to step 103 where the data stream is converted to audio voice via speaker 75 in the doll.

If the data is determined to be for movement, the data stream is directed to step 105 (I/O interface 69) and movement is initiated at step 107. At step 109 a completion signal or other sense of the directed move is returned to interface 97 for transfer to host 15. In embodiments using a microphone 73 in the doll, all voice picked up at the doll is transferred to the host, and the host discriminates by means of scripted function to respond to such input. Most input elicits no response or new commands from the host. The host, as described above, in some instances seeks audio response, and in these instances is enabled to direct continuing interaction on the basis of receipt of a response. Path 94 in FIG. 3 represents responses to the host from the doll environment, which may be voice or of other nature.

As described above, FIG. 3 is meant to represent general data and command flow in the system of the intercommunicating doll and host. It will be apparent to those with skill in the art that there are many alternatives to this diagram, and that actual communication and action is managed by CPU 43 in the host and microcontroller 61 in the doll.

Some scripted programs provided by CD-ROM provide an interactive interface on display monitor 48 at host 15, and others do not. In some instances the operation of the doll system is in the background and transparent to a user of the computer, who may be using other applications, such as a word processor or Internet browser. For example, a CD disk may be provided with stories, poetry, nursery rhymes and the like for a child, the material to be spoken to a child by the doll, prompted by the child. In this embodiment the child may request a particular selection, wherein the system may key on a word or combination in the child's spoken request, and track to that selection and recite the wanted selection. Other interactivity may be provided, such as a repeat request by the child causing the system to back up some predetermined time in the selection being played, and restart.

An application of this sort needs no display or input from an operator at the computer host. Most state-of-the-art computers are sufficiently powerful to operate such a system transparently, and still operate another application for a user.

Another useful embodiment that may operate transparently is an embodiment that simply recites selections to a child in a foreign language, that is, other than the child's native language, perhaps providing time between some words for the child to repeat words or phrases. The simple recitation is known to provide mental associations for a child in preparing the child to deal with the language at a later time.

An example of an embodiment utilizing an interface on display monitor 48 is an embodiment wherein interactivity may be altered or programmed by selection and input at the host. Some interactive applications on CD-ROM may have alternative scripts at alternative portions in a single script. A menu interface in these cases is presented on the display monitor enabling a user at the PC to select alternatives.

In some embodiments, programming may be done at an interactive interface on display monitor 48. A parent may, for example, in some embodiments, record messages and stories for a child, which than become a part of a script for interactivity between the child and doll 13.

It was described above that use may be made in some embodiments of modem 51 with Internet access software and browser software. In one embodiment, the modem connection may be used to connect two hosts each having loaded routines to interact with a doll 13 (two dolls at two different locations, which may be any distance apart). A link is established in this embodiment between a child at a first location, through a doll to a host PC at the first location, to a PC at another location, and from that PC to another doll to another child. The two children may then interact through the two dolls.

It will be apparent to those with skill in the art that there are many uses for such a powerfully interactive doll or other entity, having all of the capability of a state-of-the art PC. Uses have been described for educational purposes, for behavioral science (a child psychologist may use such a doll to interface with a child patient), for language familiarization and instruction, for games, for storytelling, and for many other purposes. As described briefly above, third party suppliers are to be encouraged in the practice of this invention, to prepare scripts for many purposes for persons having dolls and computer hosts according to various embodiments of the invention. Every new script provides a new embodiment of the invention.

It will also be apparent to those with skill in the art that there are many alterations that might be made in both hardware and control aspects in embodiments of the invention described herein without departing from the spirit and scope of the invention. There are, for example, many ways the electronic circuitry, the servo-mechanical mechanisms, and the communication elements in the doll might be implemented. Some dolls within the scope of this invention might have simply two-way voice communication with a host, while others may have very extensive robotic systems and sensors. Similarly software aspects may vary widely. Software is an art as much as a science, and many programmers have personal preferences for code sequences and the like to accomplish similar ends.

What is claimed is:

1. An interactive system comprising:
   a personal computer (PC) having a CPU, a memory, a first communication port adapted for peripheral communication coupled to the CPU, and control routines executable by the CPU;
   a personalized entity separate from the PC, having therein control circuitry coupled to a microphone, to a speaker and to a second communication port adapted for peripheral communication; and
   a communication link coupling the first and the second communication ports;
   wherein, through execution of the control routines by the CPU, communication is executed between the PC and the personalized entity as a peripheral device, wherein stored audio data is retrieved by the CPU, passed to the personalized entity via the communication link converted to analog audio at the speaker in the personalized entity, and wherein voice input via the microphone in the personalized entity is converted to audio data by the control circuitry, transferred to the computer via the communication link, and is utilized at the computer in conjunction with the control routines to guide selection of stored audio data to be retrieved and sent to the personalized entity.

2. An interactive system as in claim 1 wherein the personalized entity is a doll.

3. An interactive system as in claim 1 wherein the communication link coupling the first and the second communication ports is a two-way wireless communication link.

4. An interactive system as in claim 1 comprising multiple personalized entities coupled to a single computer and operated simultaneously.

5. An interactive system as in claim 2 further comprising servo-mechanisms adapted for manipulating parts of the doll, wherein the control circuitry comprises an input/output (I/O) interface connected to and manageable by the control circuitry to switch power from an on-board power supply to activate individual ones of the servo-mechanisms to provide doll motion according to movement data sent to the doll via the communication link.

6. An interactive system as in claim 5 further comprising sensors adapted for sensing movement and environmental characteristics in the environment of the doll and wherein input from the sensors is communicated via the communication link to the computer and utilized in conjunction with the control routines to guide selection of motion commands to be sent to the doll to initiate motions by individual ones of the servo-mechanisms.

7. An interactive doll, comprising:
   a microcontroller coupled to digital memory;
   a sound circuitry coupled to the microcontroller and connected to a microphone and a speaker, the sound circuit adapted for converting audio data to analog audio output at the speaker and for converting analog audio input at the microphone to audio data; and a (bidirectional communication interface) peripheral port coupled to the microcontroller, for connection to a host computer;

wherein the interactive doll operates as a peripheral device through the peripheral port, and wherein analog audio input at the microphone is converted into audio data by the sound circuitry and transmitted at the peripheral port, and wherein audio data received at the peripheral port is converted by the sound circuitry and provided as analog audio output at the speaker.

8. An interactive doll as in claim 7 further comprising an I/O interface, coupled to the microcontroller and to servo-mechanisms adapted to move portions of the doll, and an on-board power supply, and wherein movement commands received at the peripheral port are utilized to activate individual ones of the servo-mechanisms to provide movement of associated portions of the doll.

9. An interactive doll as in claim 8 further comprising sensors adapted for sensing doll movement and characteristics of doll environment, and wherein signals from the sensors are converted to data signals at the I/O interface and transferred to the peripheral port for transmission.

10. An interactive doll as in claim 7 where in the peripheral port is connected to a cordless communication interface for communication as a peripheral device with the host computer.

11. An interactive doll as in claim 10 wherein the cordless communication interface is one of an infra-red interface, a radio frequency broadcast interface, a fiber-optic interface, and an inductively-coupled interface.

12. An interactive doll as in claim 7 wherein the microcontroller, the sound circuitry, and the communication interface are all implemented on an application-specific integrated circuit (ASIC).

13. An interactive personal article comprising:

a microcontroller coupled to digital memory;

sound circuitry coupled to the microcontroller and connected to a microphone and a speaker, the sound circuitry adapted for converting audio data to analog audio output at the speaker and for converting analog audio input at the microphone to audio data; and a peripheral port coupled to the microcontroller, for connection to a host computer;

wherein the interactive personal article operates as a peripheral device through the peripheral port, and wherein analog audio input at the microphone is converted into audio data by the sound circuitry and transmitted at the peripheral port, and wherein audio data received at the peripheral port is converted by the sound circuitry and provided as analog audio output at the speaker.

14. An interactive personal article as in claim 13 further comprising an I/O interface coupled to the microcontroller and to servo-mechanisms adapted to move portions of the interactive personal article, and an on-board power supply, and wherein movement commands received at the peripheral port are utilized to activate individual ones of the servo-mechanisms to provide movement of the associated portions of the interactive personal article.

15. An interactive personal article as in claim 13 wherein the external aspect is that of one of a human doll or a stuffed animal.

16. An interactive personal article as in claim 15 further comprising sensors adapted for sensing movement of portions of the doll or stuffed animal and characteristics of local environment, and wherein signals from the sensors are converted to data signals at the I/O interface and transferred to the peripheral port for transmission.

17. An interactive personal article as in claim 13 wherein the peripheral port is connected to a cordless communication interface for communication as a peripheral device with the host computer.

18. An interactive personal article as in claim 17 wherein the cordless communication interface is one of an infra-red interface, a radio frequency broadcast interface, a fiber-optic interface, and an inductively-coupled interface.

19. An interactive personal article as in claim 13 wherein the microcontroller, the sound circuitry, and the peripheral port are all implemented on an application-specific integrated circuit (ASIC).

20. A method for teaching, comprising steps of:

(a) retrieving audio selections from digital memory associated with a computer as primary digital audio data;

(b) sending the audio data to a first peripheral port in the environment of the computer and thence over a communication link to an electronic doll adapted as a peripheral device to the computer, the electronic doll in proximity to a child;

(c) receiving the audio data at a second peripheral port in the electronic doll and converting the audio data to analog audio output at a speaker incorporated in the electronic doll;

(d) receiving speech from the child at a microphone associated with the electronic doll;

(e) converting the child's speech to return audio data;

(f) transmitting the return audio data via the second peripheral port over the communication link from the doll to the computer; and (g) using the return audio data in the computer as criteria for selecting further audio data for transmission to the doll.

21. The method of claim 20 comprising additional steps for providing movement for the doll via servo-mechanisms in the doll, the servo-mechanisms directed by commands retrieved from the computer memory and transferred to the electronic doll over the communication link, the movements predicated to enhance the teaching experience for the child.

* * * * *